United States Patent [19]

Woodall et al.

[11] Patent Number: 4,809,245

[45] Date of Patent: Feb. 28, 1989

[54] SEISMIC DETECTOR HOUSING ASSEMBLY

[75] Inventors: James C. Woodall; S. E. Haggard, both of Houston, Tex.

[73] Assignee: Mark Products Incorporated, Houston, Tex.

[21] Appl. No.: 86,387

[22] Filed: Aug. 17, 1987

[51] Int. Cl.[4] .............................................. G01V 1/16
[52] U.S. Cl. ..................................... 367/188; 367/178
[58] Field of Search ........................ 367/188, 178, 173

[56] References Cited

U.S. PATENT DOCUMENTS

| 2,956,215 | 10/1960 | Andrea et al. | 439/78 |
| 3,993,859 | 11/1976 | McNeel | 367/188 |
| 4,117,449 | 9/1978 | McNeel | 367/188 |
| 4,594,698 | 6/1986 | Hefer | 367/188 |

OTHER PUBLICATIONS

"An Electrical Component Package," Western Electric Technical Digest, No. 64, Oct. 1981.

Primary Examiner—Thomas H. Tarcza
Assistant Examiner—Ian J. Lobo
Attorney, Agent, or Firm—Vaden, Eickenroht, Thompson & Boulware

[57] ABSTRACT

A seismic detector housing assembly is disclosed having a housing open at one end, a seismic detector having an outer case with generally flat end walls, and a pair of terminals extending out of the case through one end wall located in the housing with the terminals extending outwardly from the open end of the housing. A seal member of elastomeric material having openings, through which the terminals extend, covers the end of the detector and closes the open end of the housing. A PC board for connecting the terminals to leader wire conductors covers the seal member. A cup-shaped cap is attached to the housing to enclose the terminals and an outer edge to engage the PC board and compress the seal member into sealing engagement with the cap and the housing.

3 Claims, 1 Drawing Sheet

SEISMIC DETECTOR HOUSING ASSEMBLY

This invention relates to a seismic detector housing assembly. This is the housing or case that encloses the seismic detector that keeps water from getting inside the housing and reaching the seismic detector and that provides means for connecting the housing to multiconductor leader cables to allow the conductors to be connected to the external terminals of the seismic detector.

On land, the most commonly used seismic detector is the geophone and in the description to follow, the invention will be described in connection with a geophone housing although it can be used with other types of seismic detectors.

As stated above, the geophone housing must perform certain functions. It must prevent water from reaching the geophone and the electrical connections between the geophone and the conductors of the leader cable. It must hold the geophone securely in the housing preventing substantially all relative movement between the geophone and the housing. It must provide means for securely attaching the housing to the leader cable, while preventing water from migrating along the leader cable into the interior of the housing. It must be easily assembled and disassembled. This is particularly important because quite often repairs must be made to geophones in the field or they must be replaced and it is essential that the replacing and the reconnecting of the geophone terminals electrically to the conductors and the leader cable be easily accomplished.

The geophone case or housing of this invention includes a printed circuit board through which the terminals of the geophone are connected electrically to the conductors of the leader cable. U.S. Pat. No. 4,594,698 which issued June 10, 1986 and is entitled "Printed-Circuit Disc for Stringing Geophones", uses a printed circuit (PC) board for the same purpose. There are several problems, however, with the structural arrangement proposed in this patent. For example, the terminals of the geophone are soldered directly to the conductive strips on the PC board. This would create a substantial problem in desoldering particularly in the field, to release the PC board from the terminals in order to reach the geophone. In addition, by soldering the terminals directly to the conductive strip on the PC board and then soldering the conductive strips to the conductor wires of the leader cable, tensile forces imposed on the conductors of the leader cable are transmitted through the PC board to the terminals, which is undesirable. Further, because the terminals are soldered to the PC board, any clamping action provided to hold the geophone against longitudinal movement relative to the housing would be imposed directly on the terminals and put the terminals in compression. Generally, such terminals are not designed to take such stress. The U.S. Pat. No. 4,594,698 does not show or described any clamping action such as just described, but this is considered desirable in most geophone housing assemblies with the result that if the geophone was so clamped against the bottom of the housing through the PC board, the undesirable load on the terminals would result.

It is an object of this invention to provide a seismic detector housing assembly that includes a PC board to electrically connect the terminals of the seismic detector to the PC board through pigtails so that the PC board can move relative to the terminals without imposing any stresses on the terminals themselves.

It is a further object of this invention to provide a housing in which the geophone for the seismic detector is held against longitudinal movement relative to the housing by being clamped between the bottom of the housing and the PC board when the housing cap is connected to the housing.

It is a further object of this invention to provide such a seismic detector housing assembly in which the clamping action imposed on the PC board by the housing cap also compresses an elastomeric seal member located between the PC board and the geophone to move the sealing member into sealing engagement with the geophone and the walls of the housing.

These and other objects, advantages, and features of this invention will be apparent to those skilled in the art from a consideration of the specification, including the attached drawings and appended claims.

IN THE DRAWINGS

Figure 1:
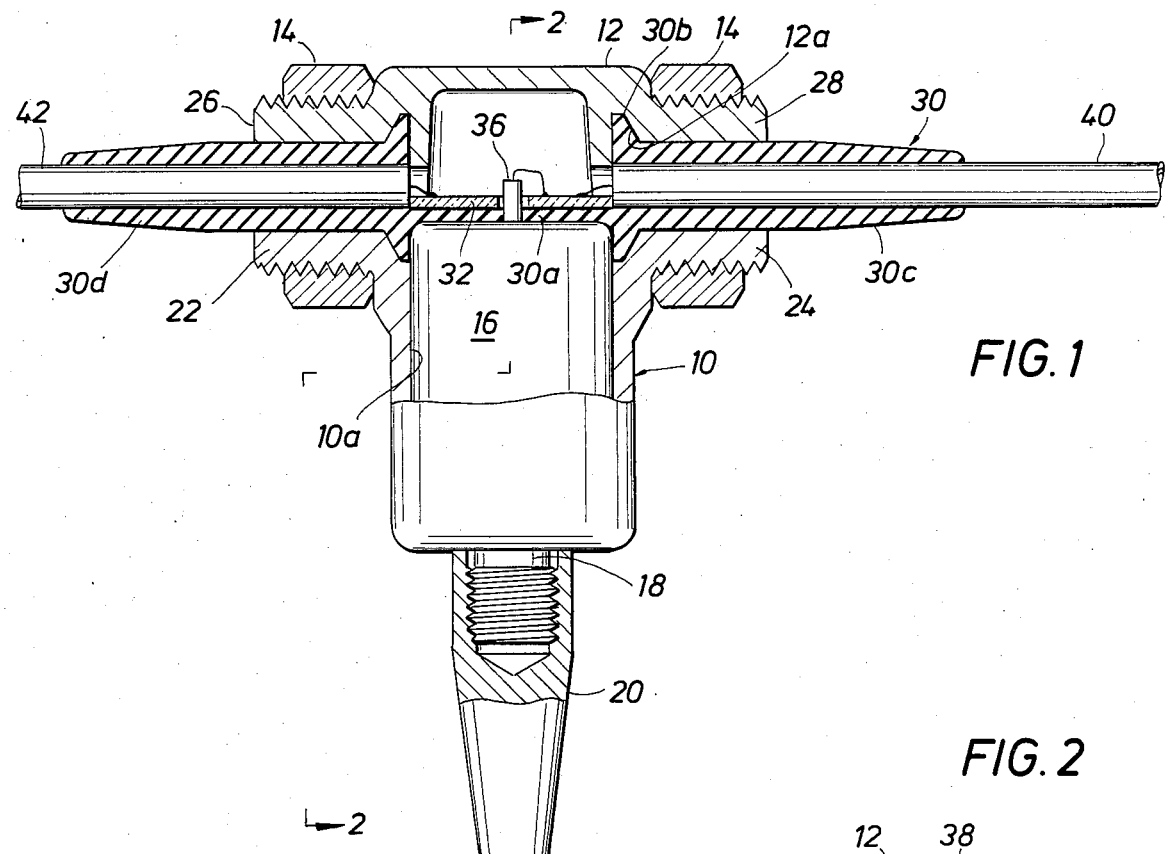
FIG. 1 is a view, partly in section and partly in elevation, of the seismic detector housing assembly of this invention.
Figure 2:
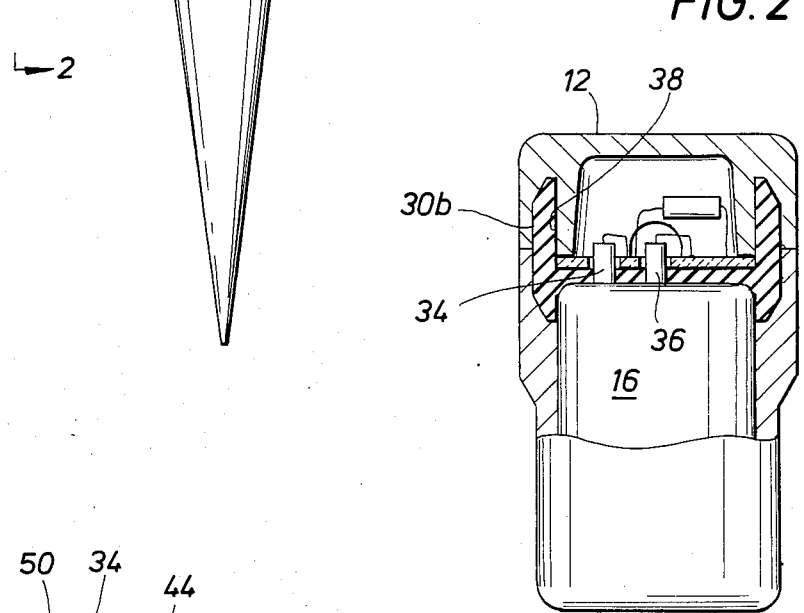
FIG. 2 is a section taken along line 2—2 of FIG. 1.
Figure 3:
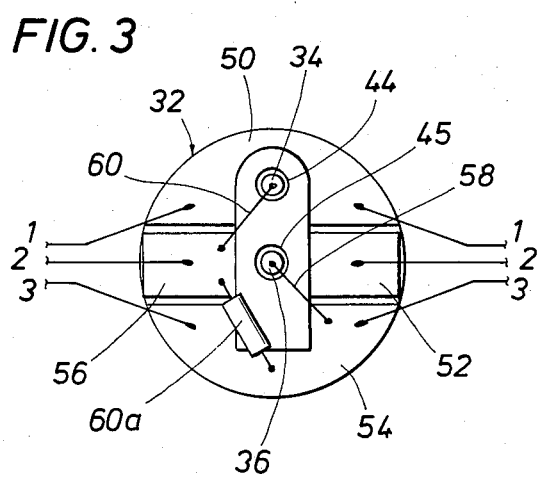
FIG. 3 is a plan view of a typical PC board for use in this housing assembly, this one being specifically designed to connect the geophone in series-parallel.

In the embodiment shown, the housing assembly includes housing 10, cap 12, and retaining nuts 14. Housing 10 has cylindrical cavity 10a, which is closed at the lower end and open at its upper end. The cavity is cylindrical in cross-section and is designed to provide a snug fit with geophone 16 so that there is no lateral relative movement between the geophone and the housing. The housing includes threaded stud 18 that is used to connect spike 20 to the lower end of the housing. By pushing the spike into the ground, a good connection is provided between the ground, the geophone housing, and the geophone.

The housing includes semi-circular threaded members 22 and 24 located on opposite sides of the housing that combine with threaded semi-circular members 26 and 28 on the cap to form circular threaded members, on opposite sides of the cap and housing, having threads that mate with the threads on nuts 14. When the nuts are made up on the threaded members on FIG. 1, they will complete the assembly of the geophone housing. At the same time, the cap will compress circular disc portion 30a of seal member 30 between the upper surface of geophone 16 and PC board 32, thereby forcing circular disc portion 30a into sealing engagement with terminals 34 and 36 of the geophone and with the upper end of the geophone case.

Seal member 30 also includes annular section 30b. The upper portion of this section is located in annular groove 38 in cap 12 and the lower portion extends downwardly into the open end of the housing to surround the upper end of geophone 16. Extending outwardly from opposite sides of annular portion 30b of the seal member are tubular portions 30c and 30d in which are located sections 40 and 42 of a leader cable. The various portions of seal member 30 are designed so that when the nuts are made up on threaded sections 22-28, the elastomeric material of the seal member will be compressed between the cap and the housing and forced into sealing engagement with the clamping surfaces such that water will be prevented from entering the internal cavities of the housing and the cap.

PC board 32 is provided with openings 44 and 45 through which terminals 34 and 36 extend. Ample clearance is provided between the terminals and the PC board by these openings so that the PC board can move downwardly toward the geophone and compress section 30a of the seal member without imposing any compressive load on the terminals. Also, some lateral movement of the PC board relative to the terminals is also allowed without imposing any stresses on the terminals.

In the embodiment shown, PC board 32 includes four conductive strips 50, 52, 54, and 56. This PC board is designed to connect the terminals to a leader having three conductors (1, 2, and 3). Geophone terminals 44 and 45 are connected to conductive strips 54 and 56 by pigtails 58 and 60. By using pigtails, movement of the PC board will not impose any stress on the terminals because of the flexibility of the pigtails.

Conductors 1 of the leader cables are connected to conductive strip 50. Conductors 2 are connected, respectively, to conductive strip 52 and 56 and both conductors 3 are connected to conductive strip 54. Damping resistor 60a in this arrangement, is connected between conductive strips 54 and 56. As stated above, this particular pattern of conductive strips is designed for connecting the geophone in series-parallel.

From the foregoing it will be seen that this invention is one well adapted to attain all of the ends and objects hereinabove set forth, together with other advantages which are obvious and which are inherent to the apparatus and structure.

It will be understood that certain features and subcombinations are of utility and may be employed without reference to other features and subcombinations. This is contemplated by and is within the scope of the claims.

Because many possible embodiments may be made of the invention without departing from the scope thereof, it is to be understood that all matter herein set forth or shown in the accompanying drawings is to be interpreted as illustrative and not in a limiting sense.

What is claimed is:

1. A seismic detector housing assembly comprising a housing open at one end, a seismic detector having an outer case with generally flat end walls and a pair of terminals extending out of the case through one end wall, said detector being located in the housing with the terminals extending outwardly from the open end of the housing, a seal member of elastomeric material covering the end of the detector and closing the open end of the housing, said seal member having openings through which the terminals extend, said opening having a diameter such that the elastomeric material of the seal member will form a watertight seal around the terminals when compressed, a printed circuit board located on the opposite side of the seal member from the detector, said printed circuit board having openings through which the terminals extend, said openings being sufficiently large for the printed circuit board to move relative to the terminals along the longitudinal axes of the terminals to allow the seal member to be compressed between the printed circuit board and the detector and to move laterally of the terminals when the board is subjected to a lateral force, and a cup-shaped cap attached to the housing having a cavity enclosing the terminals and an outer edge clamping the seal member between the detector and the printed circuit board with sufficient force to compress the seal member into sealing engagement with the end wall of the detector, the terminals, and the printed circuit board.

2. The assembly of claim 1 further provided with semi-circular threaded members extending outwardly from opposite sides of the housing and semi-circular threaded members extending outwardly from opposite sides of the cap that combine with the semi-circular threaded members on the housing to form circular threaded members, said seal member including tubular portions that extend outwardly from opposite sides of the seal member between the threaded semi-circular members, leader cable extending through the tubular portions of the seal member, and nuts engaging the threads of the semi-circular members to compress the tubular portions into sealing engagement with the semi-circular members and the leader cable and to cause the cap to force the printed circuit board toward the end wall of the detector to compress the seal member into sealing engagement with the printed circuit board and the end wall of the detector.

3. The assembly of claim 2 in which the cap has an annular groove and the seal member includes an annular section that extends into the annular groove and into the housing around the end of the detector, said annular section being compressed into sealing engagement with the cap, the housing, and the detector when the nuts are made up on the circular threaded members formed by the semi-circular threaded members.

* * * * *